United States Patent
Abraham

(10) Patent No.: US 12,200,026 B2
(45) Date of Patent: Jan. 14, 2025

(54) SYSTEMS AND METHODS FOR COMMUNICATION MONITORING

(71) Applicant: Avaya Management L.P., Durham, NC (US)

(72) Inventor: Jinson Abraham, Stittsville (CA)

(73) Assignee: Avaya Management L.P., Durham, NC (US)

(*) Notice: Subject to any disclaimer, the term of this patent is extended or adjusted under 35 U.S.C. 154(b) by 130 days.

(21) Appl. No.: 17/828,907

(22) Filed: May 31, 2022

(65) Prior Publication Data

US 2023/0412655 A1  Dec. 21, 2023

(51) Int. Cl.
*H04L 65/403* (2022.01)
*G06F 40/10* (2020.01)
*H04L 65/1089* (2022.01)
*H04L 65/1093* (2022.01)

(52) U.S. Cl.
CPC ........... *H04L 65/403* (2013.01); *G06F 40/10* (2020.01); *H04L 65/1089* (2013.01); *H04L 65/1093* (2013.01)

(58) Field of Classification Search
CPC .............. H04L 65/403; H04L 65/1089; H04L 65/1093; G06F 40/10
See application file for complete search history.

(56) References Cited

U.S. PATENT DOCUMENTS

| | | | |
|---|---|---|---|
| 6,505,031 B1 | 1/2003 | Slider et al. | |
| 9,805,219 B2 | 10/2017 | Amacker et al. | |
| 10,262,301 B2 | 4/2019 | Photowat | |
| 11,398,999 B1* | 7/2022 | Shrestha | G08B 21/0269 |
| 2014/0120511 A1* | 5/2014 | Hall | G09B 5/02 434/350 |
| 2015/0120362 A1* | 4/2015 | Whorley, Jr. | G06Q 50/205 705/7.19 |
| 2016/0361663 A1* | 12/2016 | Watry | H04L 67/10 |
| 2016/0381533 A1* | 12/2016 | Fogelson | H04W 4/18 455/414.1 |
| 2019/0272317 A1* | 9/2019 | Wroczynski | H04L 51/046 |
| 2020/0213368 A1* | 7/2020 | Rangel | H04L 65/4015 |
| 2020/0341625 A1* | 10/2020 | Roedel | H04N 7/147 |
| 2021/0382675 A1* | 12/2021 | Sharma | G06F 40/169 |

* cited by examiner

*Primary Examiner* — Michael A Keller
*Assistant Examiner* — Thao D Duong
(74) *Attorney, Agent, or Firm* — Sheridan Ross P.C.

(57) ABSTRACT

In a traditional classroom setting a teacher is present to monitor the student and their behavior. With virtual classrooms becoming more common, and parents often required to be physically present at their jobs or other engagements, students are often home alone. A teacher conducting a virtual class may not notice when a student closes their eyes, leaves, or performs other undesired actions. By providing the students with a full two-way communication with their teacher, the student is presented with a lesson and classroom activities. By providing a parent or other authorized person with a feed signal that excludes children that are not their own, the parent may remotely monitor the student, such as to ensure the student is attentive to their teacher or otherwise not engaged in any undesired activities.

20 Claims, 5 Drawing Sheets

SYSTEMS AND METHODS FOR COMMUNICATION MONITORING

FIELD OF THE DISCLOSURE

The invention relates generally to systems and methods for monitoring a communication and particularly to parental supervision of a student's activities during a remote classroom session.

BACKGROUND

Remote learning has become more commonplace. However, short of installing physical cameras in a student's room or being physically present in the room, there is no good way for parents (even when they are at home) to check up on children when they are attending an online class or remote learning conference. A parent being physically present in the room can distract the child and also tie up the parent's time. Physical cameras offer a partial solution by allowing parents to watch what the children are doing physically in the room, but the children's attention to the remote teacher or other online activities remains unmonitored. As a result, students may be inattentive or exhibit other undesired behavior that may go unnoticed.

SUMMARY

As remote learning continues to expand, there is a greater need for remote monitoring and conference flexibility.

These and other needs are addressed by the various embodiments and configurations of the present invention. The present invention can provide a number of advantages depending on the particular configuration. These and other advantages will be apparent from the disclosure of the invention(s) contained herein.

In a traditional classroom setting, students are physically present with a teacher or other school officials, who monitor the students. With remote learning and online classes, for most children, especially the younger ones, there is still a need to be with the children, such as within the same room or sitting next to them, while they are attending online classes. It may not always be possible for a parent or other authorized adult to be with or sit with a child. Even when it is possible, it may be problematic, such as when the presence of a parent is distracting to the child or limits the parent's ability to perform other tasks.

As an overview, and in one embodiment, an invitation is sent to the students of a class for an online lesson. A parent or parents receive a link to receive a limited portion of the online lesson. The link sent to the parent(s) enables a communication session that only receives the feed signals (e.g., audio, video, text, document uploads, screen sharing, etc.) for only the child/children they are authorized, such as their own child/children. The parent's or parents' communication session may also include feeds that a teacher, moderator, or other provider sends to the student, such as audio, video, text, or documents. The parent(s) can then monitor communication being sent and received by their child/children. The teacher may be provided with an indicator of parental attendance, but no indication that the parent is monitoring the educational session is provided to the child. If the parent wishes, they can send messages to their child and/or the teacher and/or the second parent who may be monitoring the child.

Authorization to monitor a student or students may be provided to the parent(s) of the student(s) or others duly authorized, such as a guardian(s). Parents, or others duly authorized, may grant access to their child's portion of the feed signals to be received by others, such as the other parents of the class.

Children utilizing a communication device that is being monitored may not be provided with any indication that the communication device is being monitored. Additionally or alternatively, even if the child disables her or his video feed signals with the teacher and/or rest of the class, the parent's communication device may still be provided with the video feed.

In another embodiment, the behavior of a monitored child may be analyzed, such as by an artificial intelligence (AI). An AI, which may be embodied as a neural network, is trained to recognize undesired behavior while monitoring a child. If the AI determines the child is performing an undesirable act (e.g., closing eyes, getting out of their chair, focusing their attention elsewhere, etc.), the AI may then trigger an alert to be provided to the parent—whether they are or are not currently engaged in monitoring their child.

In another embodiment, a system for monitoring a first device is disclosed comprising: a network interface to a network; a processor comprising instructions maintained in a non-transitory storage; and wherein the processor performs: hosting a first communication, via the network, between a second device and a plurality of endpoints wherein the first device is one of the plurality of endpoints and wherein each of the plurality of endpoints provides a feed signal as a portion of content of the first communication; and transmitting, via the network, a second communication to a third device, the second communication occurring concurrently with the first communication and comprising content from the content of the feed signal that is provided by the first device alone and wherein the second communication omits content from each of the plurality of endpoints other than the first device.

In another embodiment, a method for monitoring communications conducted over a network is disclosed, comprising: hosting a first communication, via the network, between a second device and a plurality of endpoints wherein the first device is one of the plurality of endpoints and wherein each of the plurality of endpoints provides a feed signal as a portion of content of the first communication; and transmitting, via the network, a second communication to a third device, the second communication occurring concurrently with the first communication and comprising content from the content of the feed signal that is provided by the first device alone and wherein the second communication omits content from each of the plurality of endpoints other than the first device.

In another embodiment, a system is disclosed, comprising: means to hosting a first communication between a second device and a plurality of endpoints wherein the first device is one of the plurality of endpoints and wherein each of the plurality of endpoints provides a feed signal as a portion of content of the first communication; and means to transmit a second communication to a third device, the second communication occurring concurrently with the first communication and comprising content from the content of the feed signal that is provided by the first device alone and wherein the second communication omits content from each of the plurality of endpoints other than the first device.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
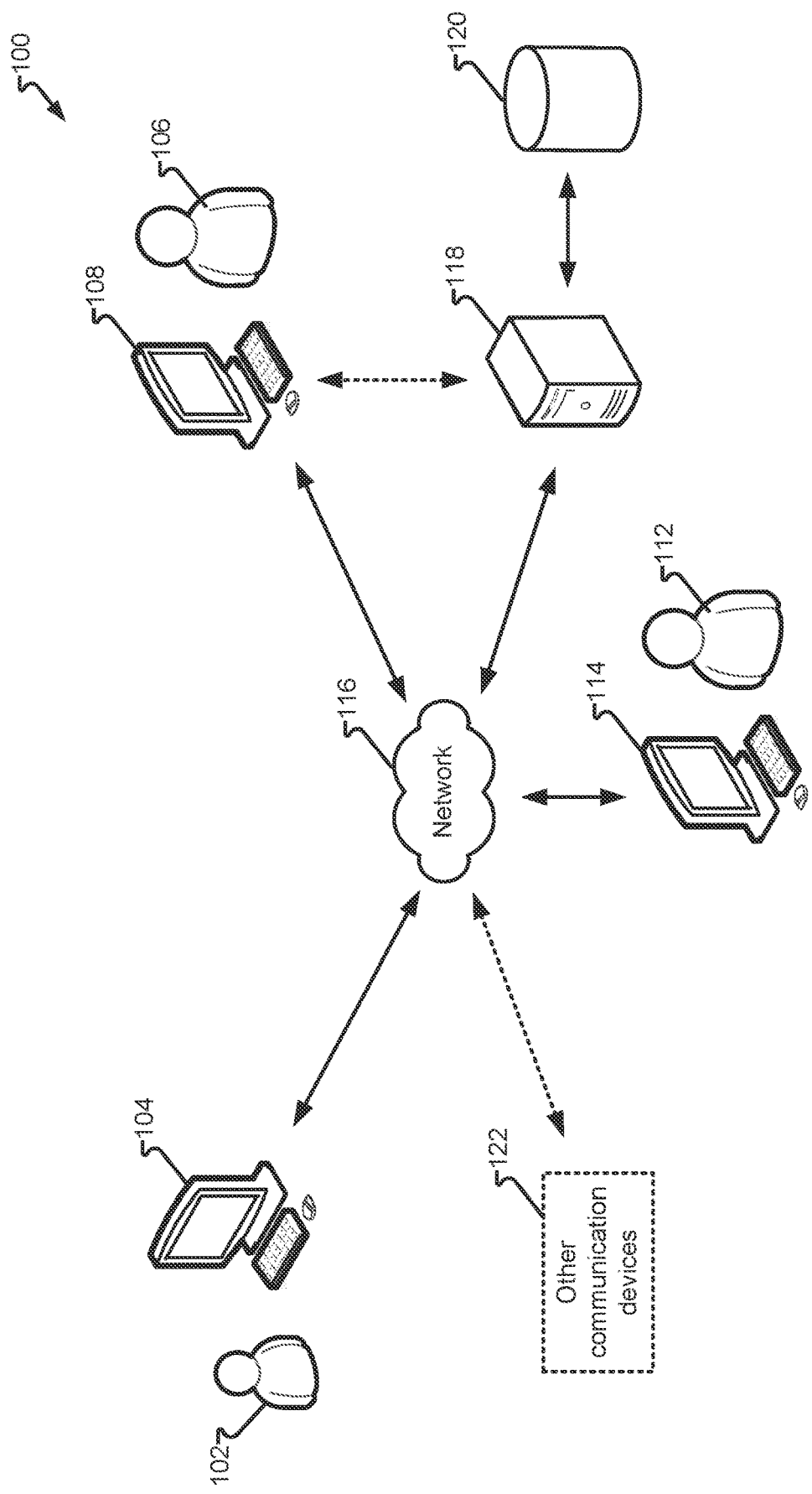
FIG. 1 depicts a first system in accordance with embodiments of the present disclosure.

FIG. 1 depicts system 100 in accordance with embodiments of the present disclosure. In one embodiment, student 102 and teacher 106 are engaged in a communication, such as a remote classroom, comprising the exchange of data via network 116. The data exchanged comprises one or more of audio signals, video signals, documents, co-browsing signals, and/or other media encoded for transmission via network 116. Server 118 comprises at least one processor and executes instructions maintained in a non-transitory storage to cause the server to host the communication. Server 118 may comprise or access data storage 120, such as to obtain records comprising connection settings, permissions, network addresses, floor control, encoding/decoding of media sent/received via network 116, and/or other purposes.

First device 104 may comprise or have access to one or more input/output devices, such as a microphone, camera, keyboard, mouse, display, speaker, etc. Similarly, second device 108 and third device 114 each comprise one or more input/output devices. While each of first device 104, second device 108, and third device 114 are illustrated as desktop computers it should be appreciated that other form factors (e.g., laptop, mobile phone, tablet, etc.) may be implemented homogenously or heterogeneously between first device 104, second device 108, and third device 114. Second device 108 provides content to first device 104 and optionally other communication devices 122. Other communication devices 122 comprises communication devices, such as those utilized by other students concurrently receiving a lesson from teacher 106 with student 102.

In another embodiment, while the first communication between teacher 106 and the students (e.g., student 102 and optionally one or more students associated with other communication devices 122), parent 112 wishes to receive signals from first device 104 but, due to security, privacy, and other concerns, not receive signals from any devices for which they are not authorized. As a result, feed signals or session content from server 118 that comprising content from any unauthorized device is not accessible and not provided to the monitoring device. For example, third device 114 is not provided with session content or feed signals from server 118 that originate from other communication devices 122 when utilized by a student who is not their own child or other authorized relationship. As can be appreciated, signals from an unauthorized device, such as a device utilized by a student who is a child of different parents, is authorized and therefore provided, to that child's parents via their own student-parent specific link. Accordingly, server 118 establishes a second communication between first device 104 and third device 114 but limited to the content provided by second device 108 and first device 104 and omitting any content from other communication devices 122.

The first communication comprises session content from second device 108 (e.g., audio, video, text, documents, etc.) to first device 104 and optionally other communication devices 122 (e.g., devices utilized by the classmates of student 102). Feed signals from first device 104 (e.g., encoded audio, video, text, etc.) are received by server 118 and always or selectively presented to second device 108 and/or one or more of parent 112 as a portion of the first communication. Similarly, one or more of other communication devices 122 may provide feed signals to server 118 for persistent or selective presentation to second device 108 and/or first device 104. However, feed signals originating from other communication devices 122 may be provided to third device 114 only when authorized (e.g., utilized by another student that is also a child of parent 112) or other authorization (e.g., class presentation to parents).

In another embodiment, server 118 provides a second communication to parent 112 via third device 114. The second communication may include feed signals provided by first device 104 and second device 108 but omits feed signals from unauthorized devices (e.g., other communication devices 122). Additionally or alternatively, a client application utilized by first device 104 may selectively allow for a video portion of the feed signals to be suspended from presentation to second device 108 and/or other communication devices 122. However, even when suspended the video portion of the feed may be provided to third device 114. Similarly, audio signals from first device 104 may be provided to third device 114 when a microphone is muted by a client application and omitted from second device 108 and/or other communication devices 122.

Figure 2:
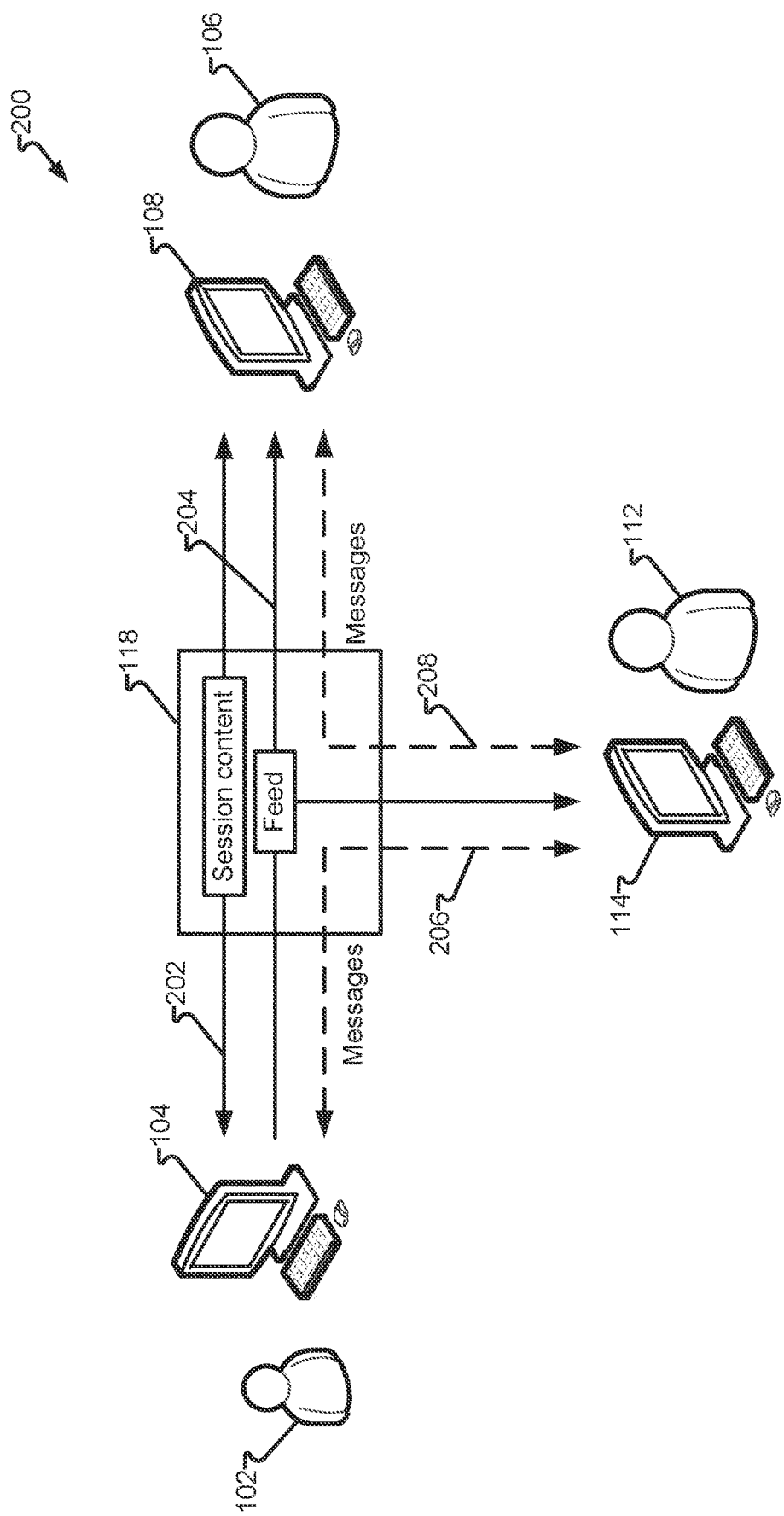
FIG. 2 depicts a second system in accordance with embodiments of the present disclosure.

FIG. 2 depicts system 200 in accordance with embodiments of the present disclosure. In one embodiment, system 200 depicts communications of system 100 (see FIG. 1) while omitting other portions of system 100 to avoid unnecessarily complicating the figure and associated description. Server 118 hosts communications, which may include session setup, receiving and sending of data packets over network 116 (see FIG. 1) to one or more addresses on network 116, reformatting/aggregating feed signals for retransmission to one or more addresses, permission management to selectively include/exclude a particular address from receiving a particular communication, encoding/decoding signal, session take down, and/or other communication operations.

Teacher 106 is providing a lesson to student 102 remotely utilizing second device 108 and first device 104, respectively. Communication between second device 108 and first device 104 is hosted by server 118 which receives session content 202 from second device 108 (e.g., audio, video, etc.) and broadcasts the content to first device 104. First device 104 provides feed signals 204, via server 118, to second device 108. Server 118 provides session content 202 and feed signals to third device 114. Server 118 does not provide feed signals to third device 114 from any unauthorized devices (e.g., other communication devices 122) that are not authorized to be monitored by a particular device (e.g., a second device 108). Additionally or alternatively, server 118 removes any portion of session content 202 that includes feed signals from any unauthorized devices. For example, teacher 106 may call on another student (not student 102) to answer a question which is presented as audio and/or video to the rest of the class as session content 202. However, the portion of session content 202 provided to third device 114 omits such content that originates as feed signals from any unauthorized devices.

In another embodiment, parent 112 may wish to send message 206 to first device 104, such as to alert student 102 to stop an undesired action that was captured in feed 204 and provided to third device 114 and optionally receive a reply. Similarly, third device 114 may send message 208 to second device 108 and optionally receive a reply.

As will be discussed more completely with respect to process 400 (below), in another embodiment, server 118 may analyze feed signals 406 for undesired content and, if discovered, provide an alert message to second device 108 and/or third device 114.

Figure 3:
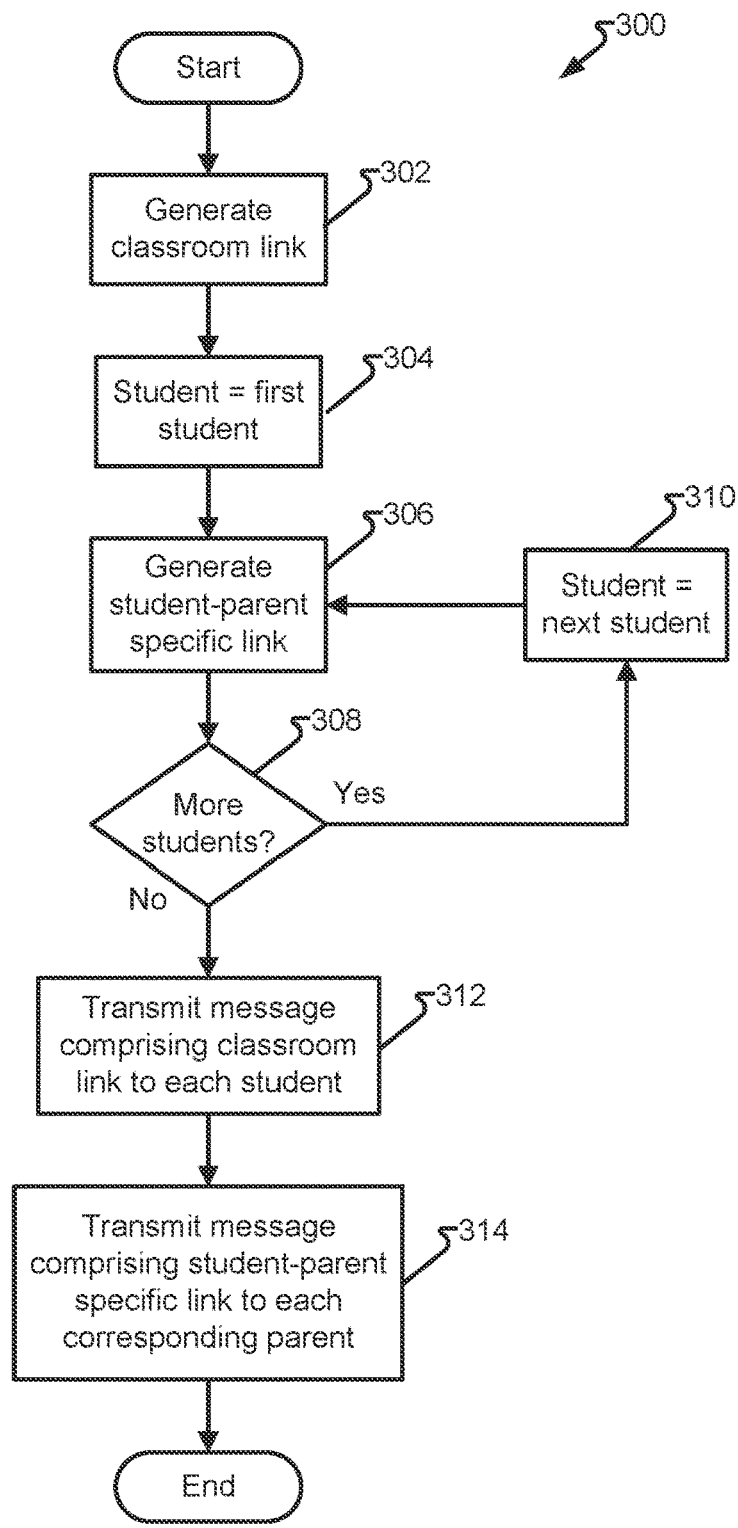
FIG. 3 depicts a first process in accordance with embodiments of the present disclosure.

FIG. 3 depicts process 300 in accordance with embodiments of the present disclosure. In one embodiment, process 300 is embodied as machine-readable instructions maintained in a non-transitory memory that when read by a machine, such as at least one processor of server 118, cause the machine to perform the operations of process 300.

In one embodiment, process 300 begins and step 302 generates a classroom link. The classroom link is a link associated with one or more students. Step 304 sets a student index to the first student and, for the first student, step 306 generates a student-parent specific link. Step 308 determines if there are more students and, if determined in the affirmative, step 310 sets the student index to the next student and loops back to step 306 to generate the student-parent specific link for the next student. If test 308 is determined in the negative, processing continues to step 312.

Figure 4:
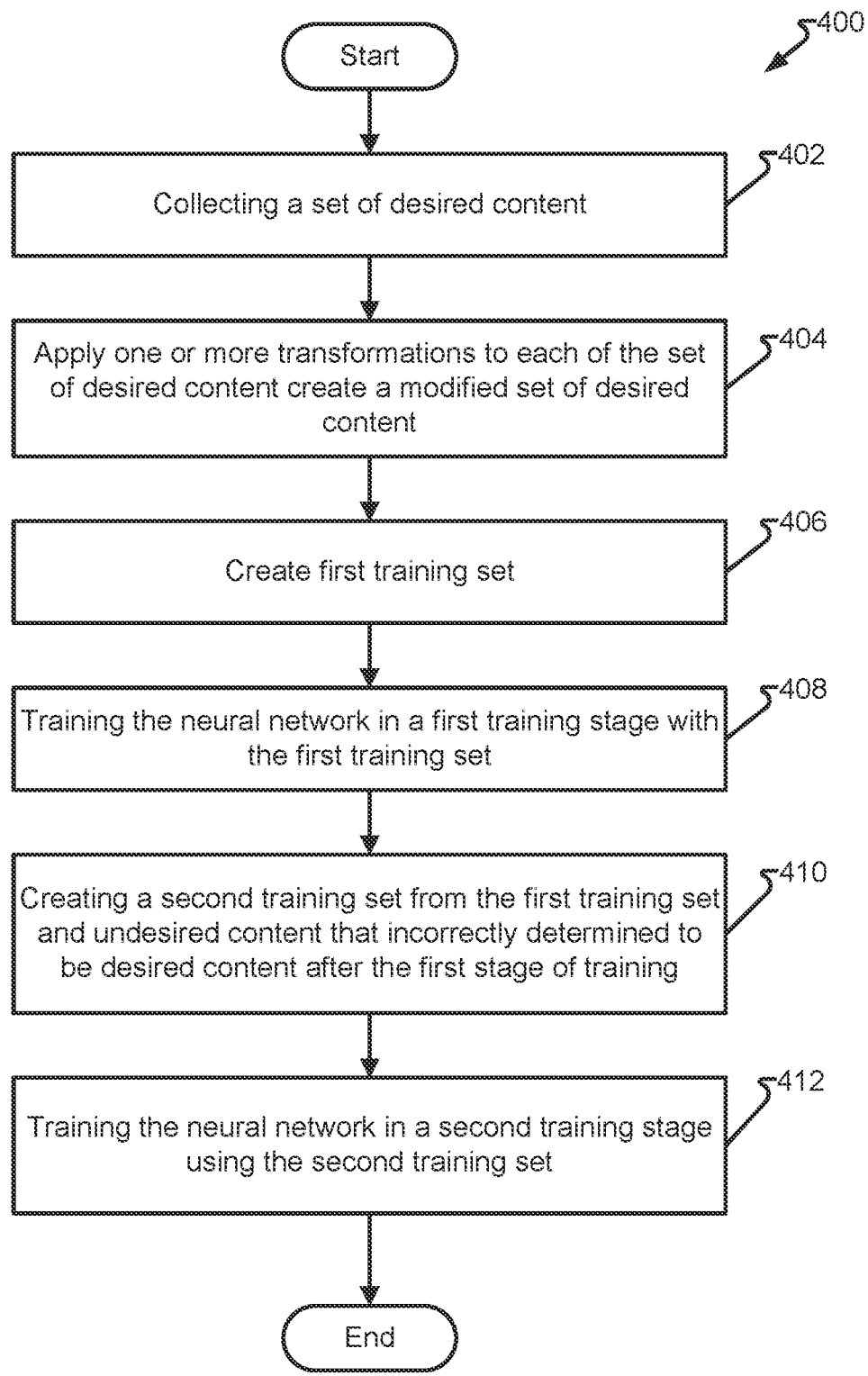
FIG. 4 depicts a second process in accordance with embodiments of the present disclosure.

Step 312 transmits a message comprising the classroom link to each student. Step 314 transmits a message comprising a student-parent specific link to each corresponding parent. For example, a parent may have an email, Simple Message System (SMS), or telephone number wherein step 314 formats and sends an email message, text message, or automated call accordingly. Subsequently, a student selecting the link provided in step 312 is connected to server 118 and the class. A parent selecting their particular student-parent specific link provided in step 314 is connected to server 118 and receives only the session content and/or feed signals authorized, such as from their child's device FIG. 4 depicts process 400 in accordance with embodiments of the present disclosure. In one embodiment, process 400 is embodied as machine-readable instructions maintained in a non-transitory memory that when read by a machine, such as at least one processor of server 118 and/or other computing device, cause the machine to perform the operations of process 400 and train a neural network.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

In one embodiment, process 400 begins and, at step 402, a set of desired content is collected. The desired content comprises electronically encoded signals received from an input device (e.g., camera, microphone, etc.) that are known to have captured a human action that is determined to be desired. For example, in the case of a student, desired behavior may include watching a display showing a session content of a teacher, taking notes, reading prescribed materials, etc. Step 404 applies one or more transformations to each of the set of desired content to create a modified set of desired content. For example, a neural network looks for patterns that are substantially the same as one or more known patterns. However, modifications may be made that comport to what is desired content, such as wearing a different colored shirt. Accordingly, transformations are applied to give the neural network exposure to some of the variations that may be encountered but which still comport with desired content. Transformations may include one or more of altering a first spoken word to a second spoken word, a first typed word to a second typed word, inserting a word into a string of words, replacing a first body position with a second body position, replacing a first eye position with a second eye position, adding eyeglasses, removing eyeglasses, altering an article of clothing, and replacing a first degree of physical body motion with a second degree of physical body motion, etc.

Step 406 creates a first training set comprising the set of desired content and the modified set of desired content. Step 408 trains the neural network in the first training stage with the first training set. Step 410 creates a second training set comprising the first training set and undesired content, such as content comprising an undesired behavior, that is incorrectly determined to be desired content after the first stage of training. Step 412 then trains the neural network in the second training state using the second training set.

The neural network, upon completion of process 400, may then receive content and determine if the content matches desired behavior. If such a determination fails, the feed content is determined to comprise undesired content. Conversely, and in another embodiment, one of ordinary skill in the art will appreciate that process 400 may be modified, such as to evaluate undesired content in place of desired content, to determine if feed signals comprise undesired behavior. If such a determination fails, the feed content is determined to comprise desired content. When undesired content is determined to be present (or absent) from desired content, an alert may be generated by server 118 and provided to second device 108 and/or third device 114.

Additionally or alternatively, the neural network may be provided with subsequent input. For example, during a prior content session, a parent signals their child to stop an undesired behavior. The neural network may then be trained (or enhanced) with the feed to further learn what is considered undesired behavior.

Figure 5:
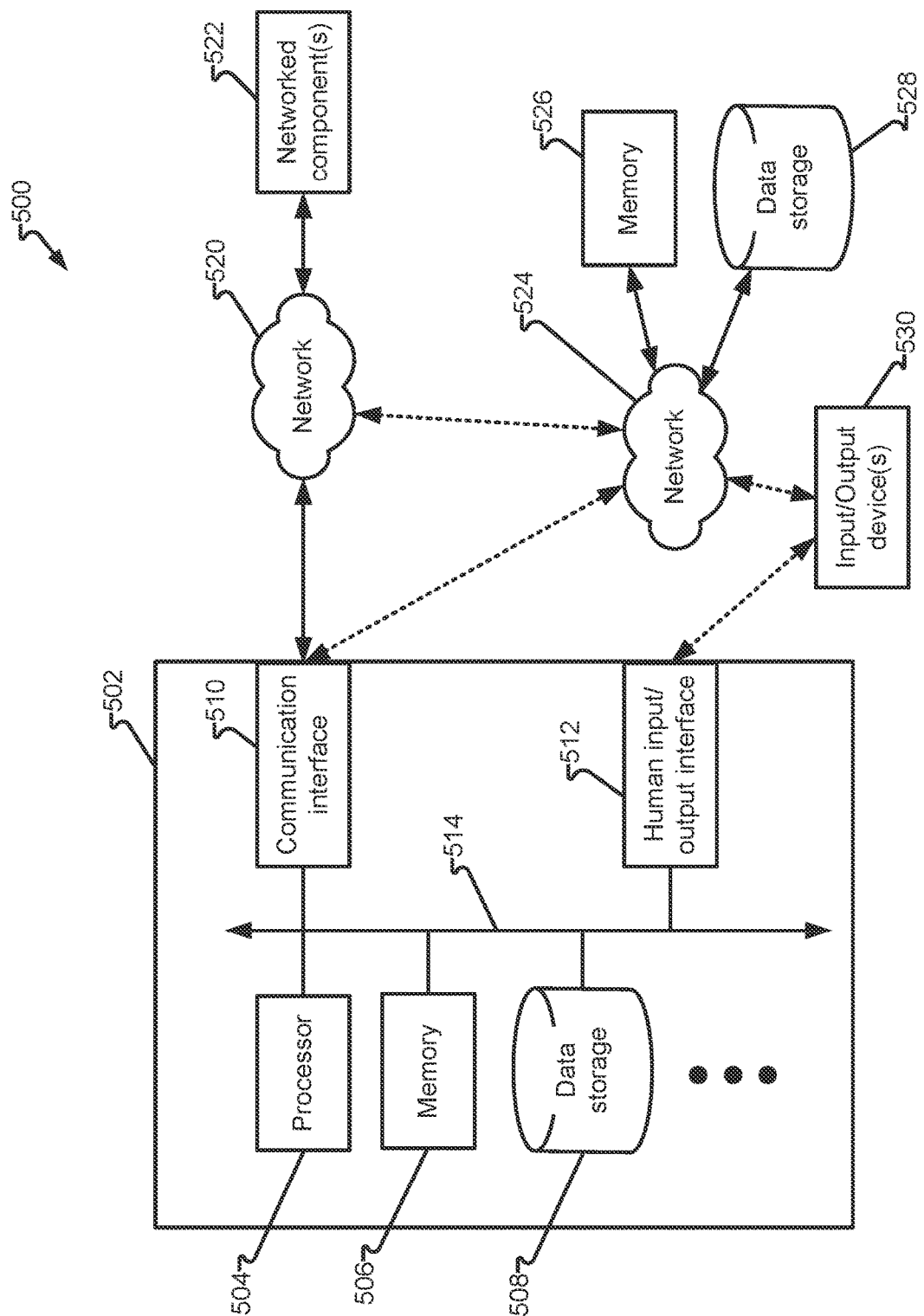
FIG. 5 depicts a third system in accordance with embodiments of the present disclosure.

FIG. 5 depicts device 502 in system 500 in accordance with embodiments of the present disclosure. In one embodiment, server 118 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 116 may be embodied, in whole or in part, as network 520. Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) than networked components 522, which may be connected to network 520 comprising a public network (e.g., Internet) that may not be as trusted.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. As another example, memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU)

that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for monitoring a first device comprising:
a network interface to a network;
a processor comprising instructions maintained in a non-transitory storage; and
wherein the processor performs:
hosting a first communication, via the network, between a second device and a plurality of endpoints, wherein the first device is one of the plurality of endpoints, wherein each of the plurality of endpoints provides a feed signal as a portion of content of the first communication, and wherein the feed signal comprises at least one of video signals or audio signals;
transmitting, via the network, a second communication to a third device, the second communication occurring concurrently with the first communication and comprising content from the content of the feed signal that is provided by the first device alone and wherein the second communication omits content from each of the plurality of endpoints other than the first device;
monitoring the feed signal from the first device;
determining the feed signal comprises undesired content;
generating an alert comprising indicia of the undesired content;
sending the alert to the third device; and
wherein the processor determines the feed signal comprises undesired content further comprising:
providing the feed signal to a neural network trained to detect undesired content; and
receiving a decision from the neural network that undesired content is present in the feed signal.

2. The system of claim 1, wherein:
the neural network is trained to receive the feed signal and return a decision whether undesirable content is present in the feed signal, comprising:
collecting a set of undesired content from a database;
applying one or more transformations to each undesired content including altering a first spoken word to a second spoken word, altering a first typed word to a second typed word, inserting a word into a string of words, replacing a first body position with a second body position, replacing a first eye position with a second eye position, and replacing a first degree of physical body motion with a second degree of physical body motion to create a modified set of undesired content;
creating a first training set comprising the collected set of undesired content, the modified set of undesired content, and a set of desired content;
training the neural network in a first stage using the first training set;
creating a second training set for a second stage of training comprising the first training set and desired content that are incorrectly detected as undesired content after the first stage of training; and
training the neural network in the second stage using the second training set.

3. The system of claim 1, wherein:
the neural network is trained to receive the feed signal and return a decision whether undesirable content is present in the feed signal, comprising:
collecting a set of desired content from a database;
applying one or more transformations to each desired content including altering a first spoken word to a second spoken word, altering a first typed word to a second typed word, inserting a word into a string of words, replacing a first body position with a second body position, replacing a first eye position with a second eye position, altering an article of clothing, and replacing a first degree of physical body motion with a second degree of physical body motion to create a modified set of desired content;
creating a first training set comprising the collected set of desired content, the modified set of desired content, and a set of undesired content;
training the neural network in a first stage using the first training set;
creating a second training set for a second stage of training comprising the first training set and undesired content that are incorrectly detected as desired content after the first stage of training; and
training the neural network in the second stage using the second training set.

4. The system of claim 1, wherein:
the neural network is trained to receive the feed signal and return a decision whether undesirable content is present in the feed signal, comprising:
accessing a set of historical feed signals previously received from a prior set of endpoints engaged in a prior first communication; and
receiving indicia from a historic third device indicating undesired content associated with a portion of one or more historical feed signals.

5. The system of claim 1, wherein the processor further performs:
receiving a request to create the first communication;
in response to receiving the request, generating a first link to an address to join the first communication and a second link to an address to join the second communication; and
sending a first invitation comprising the first link to a first address associated with a first party and a second invitation comprising the second link to a second address associated with a second party.

6. The system of claim 1, wherein the processor further performs:
receiving a request from the first device to disable video from the first device; and in response to receiving the request, omitting a video portion of the feed signal from the first communication and maintaining the video portion of the feed signal in the second communication.

7. The system of claim 1, wherein the processor further performs providing indicia of attendance of the second device when the second device is receiving the second communication.

8. The system of claim 1, wherein the processor further performs:
hosting a third communication, via the network, between a fourth device and the plurality of endpoints wherein the fourth device is one of the plurality of endpoints;
determining the second device is authorized to receive the first communication and the third communication; and
transmitting, via the network, a fourth communication to the fourth device, the fourth communication occurring concurrently with the second communication and comprising content from the content of the feed signal that is provided by the fourth device.

9. A method for monitoring communications comprising a first device and conducted over a network comprising:
hosting a first communication, via the network, between a second device and a plurality of endpoints, wherein the first device is one of the plurality of endpoints, wherein each of the plurality of endpoints provides a feed signal as a portion of content of the first communication, and wherein the feed signal comprises at least one of video signals or audio signals; and
transmitting, via the network, a second communication to a third device, the second communication occurring concurrently with the first communication and comprising content from the content of the feed signal that is provided by the first device alone and wherein the second communication omits content from each of the plurality of endpoints other than the first device;
monitoring the feed signal from the first device;
determining the feed signal comprises undesired content;
generating an alert comprising indicia of the undesired content;
sending the alert to the third device; and
wherein determining the feed signal comprises undesired content further comprises:
providing the feed signal to a neural network trained to detect undesired content; and
receiving a decision from the neural network that undesired content is present in the feed signal.

10. The method of claim 9, further comprising:
the neural network is trained to receive the feed signal and return a decision whether undesirable content is present in the feed signal, the training comprising:
collecting a set of undesired content from a database;
applying one or more transformations to each undesired content including altering a first spoken word to a second spoken word, altering a first typed word to a second typed word, inserting a word into a string of words, replacing a first body position with a second body position, replacing a first eye position with a second eye position, and replacing a first degree of physical body motion with a second degree of physical body motion to create a modified set of undesired content;
creating a first training set comprising the collected set of undesired content, the modified set of undesired content, and a set of desired content;
training the neural network in a first stage using the first training set;
creating a second training set for a second stage of training comprising the first training set and desired content that are incorrectly detected as undesired content after the first stage of training; and
training the neural network in the second stage using the second training set.

11. The method of claim 9, further comprising:
the neural network is trained to receive the feed signal and return a decision whether undesirable content is present in the feed signal, the training comprising:
collecting a set of desired content from a database;
applying one or more transformations to each desired content including altering a first spoken word to a second spoken word, altering a first typed word to a second typed word, inserting a word into a string of words, replacing a first body position with a second body position, replacing a first eye position with a second eye position, and replacing a first degree of physical body motion with a second degree of physical body motion to create a modified set of desired content;
creating a first training set comprising the collected set of desired content, the modified set of desired content, and a set of undesired content;
training the neural network in a first stage using the first training set;
creating a second training set for a second stage of training comprising the first training set and undesired content that are incorrectly detected as desired content after the first stage of training; and
training the neural network in the second stage using the second training set.

12. The method of claim 9, wherein:
the neural network is trained to receive the feed signal and return a decision whether undesirable content is present in the feed signal, the training comprising:
accessing a set of historical feed signals previously received from a prior set of endpoints engaged in a prior first communication; and
receiving indicia from a historic third device indicating undesired content associated with a portion of one or more historical feed signals.

13. The method of claim 9, further comprising:
receiving a request to create the first communication;
in response to receiving the request, generating a first link to an address to join the first communication and a second link to an address to join the second communication; and
sending a first invitation comprising the first link to a first address associated with a first party and a second invitation comprising the second link to a second address associated with a second party.

14. The method of claim 9, further comprising:
receiving a request from the first device to disable video from the first device; and
in response to receiving the request, omitting a video portion of the feed signal from the first communication and maintaining the video portion of the feed signal in the second communication.

15. The method of claim 9, further comprising providing indicia of attendance of the second device when the second device is receiving the second communication.

16. A system for monitoring a first device, comprising:
means to hosting a first communication between a second device and a plurality of endpoints, wherein the first device is one of the plurality of endpoints, wherein each of the plurality of endpoints provides a feed signal as a portion of content of the first communication, and wherein the feed signal comprises at least one of video signals or audio signals; and means to transmit a second communication to a third device, the second communication occurring concurrently with the first communication and comprising content from the content of the feed signal that is provided by the first device alone and wherein the second communication omits content from each of the plurality of endpoints other than the first device;

means to monitor the feed signal from the first device;
  means to determine the feed signal comprises undesired content;
  means to generate an alert comprising indicia of the undesired content;
means to send the alert to the third device; and
wherein the means to determine the feed signal comprises undesired content further comprises:
  means to provide the feed signal to a neural network trained to detect undesired content; and
  means to receive a decision from the neural network that undesired content is present in the feed signal.

17. The system of claim 16, wherein:
the neural network is trained to receive the feed signal and return a decision whether undesirable content is present in the feed signal, comprising:
  collecting a set of undesired content from a database;
applying one or more transformations to each undesired content including altering a first spoken word to a second spoken word, altering a first typed word to a second typed word, inserting a word into a string of words, replacing a first body position with a second body position, replacing a first eye position with a second eye position, and replacing a first degree of physical body motion with a second degree of physical body motion to create a modified set of undesired content;
creating a first training set comprising the collected set of undesired content, the modified set of undesired content, and a set of desired content;
training the neural network in a first stage using the first training set;
creating a second training set for a second stage of training comprising the first training set and desired content that are incorrectly detected as undesired content after the first stage of training; and
training the neural network in the second stage using the second training set.

18. The system of claim 16, wherein:
the neural network is trained to receive the feed signal and return a decision whether undesirable content is present in the feed signal, comprising:
collecting a set of desired content from a database;
applying one or more transformations to each desired content including altering a first spoken word to a second spoken word, altering a first typed word to a second typed word, inserting a word into a string of words, replacing a first body position with a second body position, replacing a first eye position with a second eye position, altering an article of clothing, and replacing a first degree of physical body motion with a second degree of physical body motion to create a modified set of desired content;
creating a first training set comprising the collected set of desired content, the modified set of desired content, and a set of undesired content;
  training the neural network in a first stage using the first training set;
creating a second training set for a second stage of training comprising the first training set and undesired content that are incorrectly detected as desired content after the first stage of training; and
training the neural network in the second stage using the second training set.

19. The system of claim 16, wherein:
the neural network is trained to receive the feed signal and return a decision whether undesirable content is present in the feed signal, comprising:
accessing a set of historical feed signals previously received from a prior set of endpoints engaged in a prior first communication; and
receiving indicia from a historic third device indicating undesired content associated with a portion of one or more historical feed signals.

20. The system of claim 16, further comprising:
means to receive a request to create the first communication;
means to, in response to receiving the request, generate a first link to an address to join the first communication and a second link to an address to join the second communication; and
means to send a first invitation comprising the first link to a first address associated with a first party and a second invitation comprising the second link to a second address associated with a second party.

* * * * *